United States Patent
Shiraishi

(10) Patent No.: US 12,147,184 B2
(45) Date of Patent: Nov. 19, 2024

(54) PAPER FEEDER AND IMAGE FORMING APPARATUS

(71) Applicant: SHARP KABUSHIKI KAISHA, Sakai (JP)

(72) Inventor: Yoshinori Shiraishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 188 days.

(21) Appl. No.: 17/710,194

(22) Filed: Mar. 31, 2022

(65) Prior Publication Data

US 2022/0317616 A1    Oct. 6, 2022

(30) Foreign Application Priority Data

Apr. 1, 2021    (JP) ................... 2021-062624

(51) Int. Cl.
| | |
|---|---|
| B65H 1/04 | (2006.01) |
| B65H 1/14 | (2006.01) |
| B65H 1/26 | (2006.01) |
| G03G 15/00 | (2006.01) |
| G06K 15/16 | (2006.01) |

(52) U.S. Cl.
CPC ........... *G03G 15/6502* (2013.01); *B65H 1/14* (2013.01); *B65H 1/266* (2013.01); *G06K 15/16* (2013.01)

(58) Field of Classification Search
CPC ...... G03G 15/6502; B65H 1/14; B65H 1/266; B65H 1/04; G06K 15/16
See application file for complete search history.

(56) References Cited

U.S. PATENT DOCUMENTS

| | | | | |
|---|---|---|---|---|
| 5,100,123 | A * | 3/1992 | Kagiura ................. | B65H 1/266 271/127 |
| 5,139,252 | A * | 8/1992 | Morita ................. | B65H 3/0669 271/127 |
| 5,152,517 | A * | 10/1992 | Ruch ........................ | B65H 1/04 271/9.08 |
| 5,253,015 | A * | 10/1993 | Morita ............... | G03G 15/6502 399/13 |
| 5,593,152 | A * | 1/1997 | Wirth ..................... | B65H 1/266 271/241 |
| 5,681,102 | A * | 10/1997 | Forsgren .............. | A47B 88/402 312/334.7 |
| 10,093,495 | B2 | 10/2018 | Sugishima et al. | |
| 2006/0039730 | A1 * | 2/2006 | Won .................... | G03G 15/6502 399/389 |
| 2007/0176354 | A1 * | 8/2007 | Shiohara ................. | B65H 3/56 271/162 |

FOREIGN PATENT DOCUMENTS

JP    2016-027991 A    2/2016

* cited by examiner

*Primary Examiner* — Thomas A Morrison
(74) *Attorney, Agent, or Firm* — ScienBiziP, P.C.

(57) ABSTRACT

A paper feeder includes a main body and a paper feed cassette, the main body has a pull-in device that pulls the paper feed cassette to a mounting position, and a support member that supports the paper feed cassette, the paper feed cassette has a rail that contacts a top of the support member; in an area where the rail contacts the support member when the paper feed cassette is pulled in by the pull-in device, the rail includes a first inclination that is higher toward a pull-out direction of the paper feed cassette.

8 Claims, 12 Drawing Sheets

PAPER FEEDER AND IMAGE FORMING APPARATUS

CROSS-REFERENCE TO RELATED APPLICATION

The present application claims priority from Japanese Application JP2021-062624, the content of which is hereby incorporated by reference into this application

BACKGROUND OF THE INVENTION

Field of the Invention

The present invention relates to a paper feeder and an image forming apparatus.

Description of the Background Art

An image forming apparatus such as a copier includes a paper feeder having a paper feed cassette that stores a plurality of sheets of paper in a stacked manner. Japanese Unexamined Patent Application Publication No. 2016-27991 discloses a pull-in device where, in such a paper feeder, pushing a paper feed cassette into a device main body to a certain extent automatically pull in the paper feed cassette to a predetermined mounting position for mounting the paper feed cassette.

The pull-in device disclosed in Japanese Unexamined Patent Application Publication No. 2016-27991 has a pair of pull-in modules that include engaged portions provided on the left and right rails of the device main body respectively, and engaging portions provided on the left and right of the paper feed cassette respectively.

The pull-in device disclosed in Japanese Unexamined Patent Application Publication No. 2016-27991, with the engaged portion engaged with the engaging portion at a pull-in start position, can pull in the paper feed cassette toward a pull-in end position. Due to this, when inserting the paper feed cassette into the device main body, a user can reduce a burden for pushing the paper feed cassette into the device main body.

However, Japanese Unexamined Patent Application Publication No. 2016-27991 above does not have a configuration that appropriately pulls in the paper feed cassette to a predetermined mounting position by examining the relation between the magnitude of the load generated at the time of pulling in the paper feed cassette to the mounting position and the magnitude of a pull-in force of the pull-in device.

An object of the present disclosure is to provide a paper feeder capable of appropriately pulling in a paper feed cassette to a mounting position.

SUMMARY OF THE INVENTION

A paper feeder according to one mode of the present disclosure includes: a main body; and a paper feed cassette provided so as to be capable of being inserted and pulled out in a first direction relative to the main body, wherein the main body has a pull-in device that pulls the paper feed cassette to a mounting position, and a support member that supports the paper feed cassette, and wherein the paper feed cassette has a rail that contacts a top of the support member and extends in the first direction, and in an area where the rail contacts the support member when the paper feed cassette is pulled in by the pull-in device, the rail includes a first inclination that is higher toward a pull-out direction of the paper feed cassette.

An image forming apparatus according to one mode of the present disclosure includes: a paper feeder: including: a main body, and a paper feed cassette provided so as to be capable of being inserted and pulled out in a first direction relative to the main body, wherein the main body has a pull-in device that pulls the paper feed cassette to a mounting position, and a support member that supports the paper feed cassette, and wherein the paper feed cassette has a rail that contacts a top of the support member and extends in the first direction, and in an area where the rail contacts the support member when the paper feed cassette is pulled in by the pull-in device, the rail includes a first inclination that is higher toward a pull-out direction of the paper feed cassette; and an image former that forms an image on paper sent out from the paper feeder.

According to the present disclosure, the paper feeder exerts an effect of appropriately pulling in a paper feed cassette to a mounting position.

DESCRIPTION OF THE PREFERRED EMBODIMENTS

Embodiments and modifications of the present disclosure will be described with reference to the drawings. Hereinafter, the same reference signs are given to the same or equivalent elements throughout all figures, and their duplicate descriptions are to be omitted. The embodiments and modifications described below are merely one example of the present disclosure, and the present disclosure is not limited to the embodiments and modifications. Other than the present embodiment and modifications, various changes are allowed according to the design, etc., as long as they do not deviate from the technical concept of the present disclosure.

Image Forming Apparatus

Figure 1:
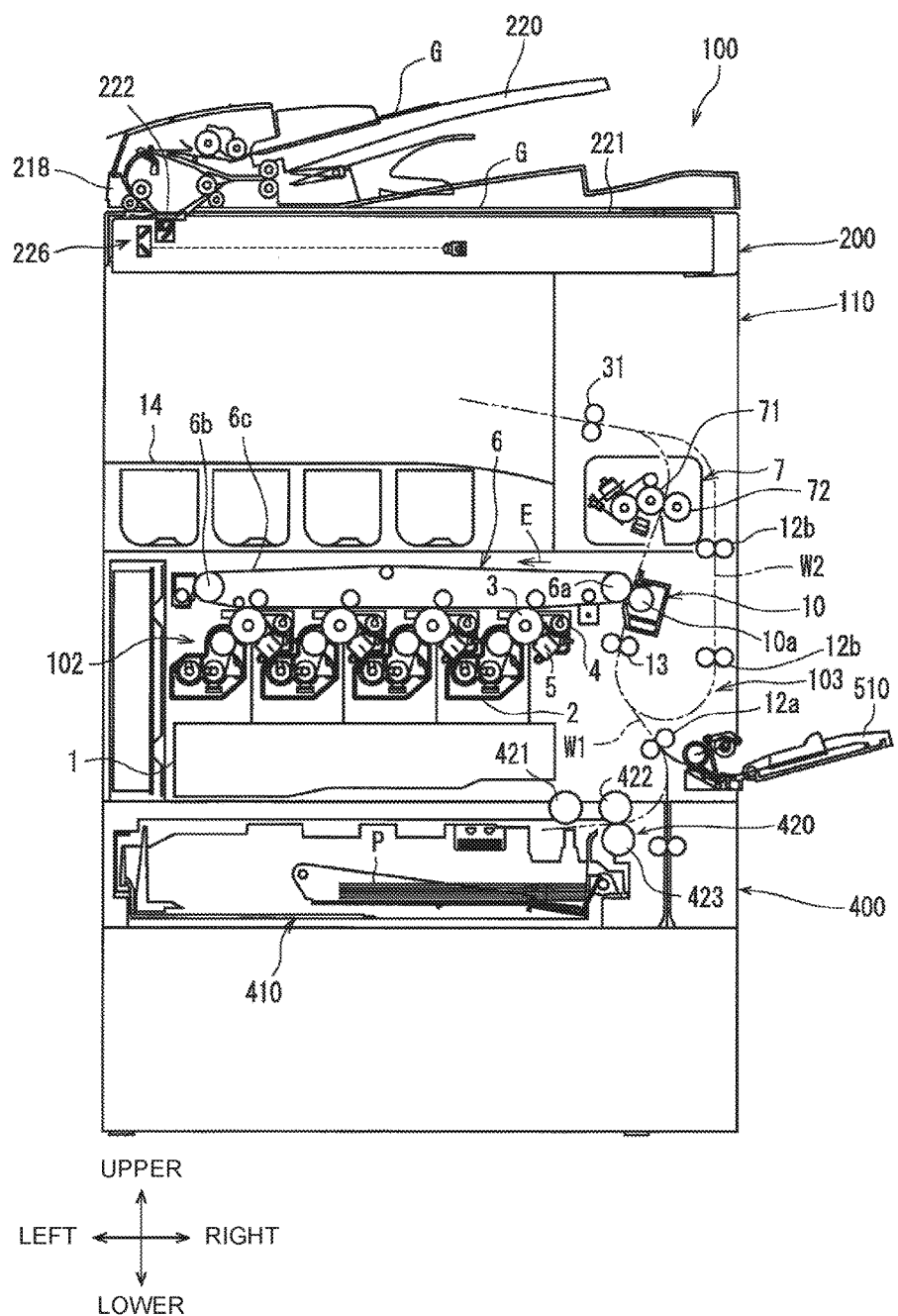
FIG. 1 schematically shows an internal configuration of an image forming apparatus as viewed from a front side.

An image forming apparatus 100 of an embodiment will be described with reference to FIG. 1. FIG. 1 schematically shows an internal configuration of the image forming apparatus 100 as viewed from a front side. In the image forming apparatus 100, among the horizontal directions when viewed from the front side, the left side is defined as a left direction, and the right side is defined as a right direction. Among the depth directions when viewed from the front side, the front side of the image forming apparatus 100 is defined as a forward direction, and the back side is defined as a rearward direction. In the image forming apparatus 100, the bottom side is defined as a downward direction and an opposite side is defined as an upward direction.

The image forming apparatus 100 according to the embodiment is a color image forming apparatus that forms multi-color and monochromatic images on a sheet P such as recording paper. Based on image data read by an image reading device 200 or image data received from an external source, the image forming apparatus 100 forms an image on the sheet P. The image forming apparatus 100 may be a monochrome image forming apparatus.

As shown in FIG. 1, the image forming apparatus 100 is configured to include a main body 110, the image reading device 200, a paper feeder 400, and a manual feed unit 510.

The image reading device 200 is provided at an upper portion of the main body 110. The image reading device 200 is a device that reads the image of a document G. The image reading device 200 is provided with a document placing stand 221 which is formed of a transparent material and on which the document G is placed. A document holder cover 218, which is mounted via a hinge or the like in a manner to freely open and close, is provided above the document placing stand 221. A document feed tray 220 is provided on an upper face of the document holder cover 218, and an automatic document feeder (ADF: Auto Document Feeder) (not shown), is provided inside the document feed tray 220. To an image reading position 222, the ADF automatically supplies, one by one, the document G placed on the document feed tray 220.

The image reading device 200 incorporates an image reader 226 that reads an image from the document G. The image reader 226 is provided with a light source, a plurality of mirrors, an imaging lens, and a line sensor, which are not shown in the figure. The image reading device 200 exposes the document G with the light emitted from the light source, and, with a plurality of mirrors, guides, to the imaging lens, the light reflected from the document G. Then, the imaging lens images the reflected light onto a light receiving element of the line sensor. The line sensor detects the luminance or chromaticity of the reflected light imaged on the light receiving element, and generates image data that is based on the document G. For example, CCD (Charge Coupled Device), CIS (Contact Image Sensor), or the like can be used as the line sensor.

In the lower portion of the main body 110, there is provided the paper feeder 400 including a paper feed cassette 410 and a sheet feeder 420.

The paper feed cassette 410 stores the sheet P to be supplied to the main body 110. The image forming apparatus 100 according to the present embodiment is configured so that 500 sheets P can be stored in the paper feed cassette 410. The sheet P stored in the paper feed cassette 410 is supplied to the main body 110 by the sheet feeder 420.

That is, the sheet feeder 420 has a call-in roller 421, a feed roller 422, and separation roller 423. The call-in roller 421 rotatably drives thereby to pull out, from the top, the sheet P stored in the paper feed cassette 410, and feeds the sheet P toward the feed roller 422 and the separation roller 423. The separation roller 423 is positioned opposite the feed roller 422. When feeding the sheet P to the main body 110, the separation roller 423 is maintained in a state of pressing the feed roller 422. Then, the separation roller 423 rotatably drives thereby to separate and convey the sheets P one by one between the feed roller 422 and the separation roller 423. Further, it is also possible to make a configuration in which, without the call-in roller 421, the feed roller 422 also serves as the call-in roller 421. In this configuration, the feed roller 422 rotates and drives thereby to pull the sheet P out of the paper feed cassette 410.

In FIG. 1, for convenience of description, only one paper feed cassette 410 and one sheet feeder 420 are shown; however, the image forming apparatus 100 according to the embodiment is configured so that three paper feed cassettes 410 are arranged in multiple steps in the vertical direction, and each paper feed cassette 410 is provided with the sheet feeder 420. Detailed configuration of the paper feeder 400 will be described below.

The manual feed unit 510 having a sheet storage is provided on the lower side on the right side of the main body 110. To the image forming apparatus 100, the manual feed unit 510 feeds the sheet P that cannot be set in the paper feed cassette 410 of the paper feeder 400.

The sheet P stored in the paper feed cassette 410 of the paper feeder 400 and the sheet P stored in the sheet storage of the manual feed unit 510 are fed through a conveyance roller 12a to a sheet conveying path W1 of the main body 110.

The main body 110 has an image former 102 and a sheet conveying system 103.

The image former 102 includes an exposing unit 1, a developing unit 2, a photoconductor drum 3 acting as an electrostatic latent image carrier, a cleaner 4, a charger 5, a primary transfer device 6, a fixing unit 7, and a secondary transfer device 10. The image former 102 forms the image on the sheet P conveyed from the paper feed cassette 410, and the like, and ejects the sheet P to a paper receiving tray 14. The image data to form the image on the sheet P includes image data read from the document G by the image reader 226 or image data sent from an external computer, etc.

Meanwhile, the sheet conveying system 103 is provided with the sheet conveying path W1. In the sheet conveying path W1, a paper stop roller 13, a transfer roller 10a of the secondary transfer device 10, a fixing roller 71 and pressurizing roller 72 of the fixing unit 7, and an ejecting roller 31 are arranged from the conveyance roller 12a to the paper receiving tray 14. This direction from the conveyance roller 12a to the paper receiving tray 14 is referred to as a sheet conveying direction.

When image formation is to be performed in the image forming apparatus 100, the charger 5, in the image former 102, uniformly charges the surface of the photoconductor drum 3. Based on the image data, the exposing unit 1 exposes the surface of the charged photoconductor drum 3 with the laser. This forms an electrostatic latent image on the photoconductor drum 3. The exposing unit 1 can be configured as a laser scanning unit (LSU) provided with a laser emitting unit, a reflecting mirror, and the like, which are not shown in the figure.

The electrostatic latent images formed on the photoconductor drum 3 are developed at the developing unit 2 and manifested as toner images respectively. That is, the developing unit 2 is provided with a developing tank that stores the toner and a developing roller that functions as a developer carrier, which are not shown in the figure. The developing unit 2 supplies the toner to the surface of the photoconductor drum 3, and the toner manifests the electrostatic latent image formed on the surface of the photoconductor drum 3. The inside of the developing tank is provided with a toner density detecting sensor (not shown) to detect the toner density. When the toner density detected by the toner density detecting sensor becomes lower than a predetermined value, the toner is replenished in the developing tank from a toner replenisher (not shown).

In the primary transfer device 6, the toner image on the photoconductor drum 3 is transferred onto an intermediate transfer belt 6c which is stretched between a driving roller 6a and a driven roller 6b and rotates along a circumferential direction E. The toner image on the intermediate transfer belt 6c is then conveyed to the secondary transfer device 10.

Meanwhile, the sheet P supplied from the paper feeder 400 or the manual feed unit 510 is conveyed through the sheet conveying path W1, via the conveyance roller 12a, to the paper stop roller 13. Then, the sheet P is conveyed by the paper stop roller 13 to the transfer roller 10a at a time when the sheet P is aligned with the toner image on the photoconductor drum 3. Then, the toner on the photoconductor drum 3 is transferred onto the sheet P by the transfer roller 10a. Then, the sheet P passes through the fixing roller 71 and the pressurizing roller 72 in the fixing unit 7, and is ejected to the paper receiving tray 14 via the ejecting roller 31.

The fixing unit 7 has the fixing roller 71 and the pressurizing roller 72, and is placed downstream in the sheet conveying direction from the image former 102 The fixing roller 71 is set so as to have a predetermined fixing temperature (e.g., 160° C.), and the sheet P passes through a nip area (fixing nip) between the fixing roller 71 and the pressurizing roller 72, thereby to melt, mix, and press the toner image transferred to the sheet P. In this way, the toner image is thermally fixed to the sheet P.

When image formation is performed not only on the surface of the sheet P but also on the back face of the sheet P, the sheet P is transferred in a reverse direction from the ejecting roller 31 through a reverse sheet conveying path W2. In the reverse sheet conveying path W2, the sheet P passes via each of reverse conveyance rollers 12b which are provided in two points at a predetermined interval, and is led to the paper stop roller 13 again with the surface and back face of the sheet P reversed. Then, the toner image is formed and fixed on the back face of the sheet P as well in the same manner as the surface of the sheet P. Then, the sheet P is ejected to the paper receiving tray 14.

After the developing and the image transferring, the toner remains on the surface of the photoconductor drum 3. Then, the image forming apparatus 100 is configured so that the cleaner 4 having a cleaning blade or the like that contacts the surface of the photoconductor drum 3 is provided, and the cleaner 4 removes the toner remaining on the surface of the photoconductor drum 3.

The main body 110 having the above configuration is also provided with a controller including a CPU and memory, etc., which are not shown in the figure. The controller is configured so as to, according to the input operation on an operation panel, etc., send a control signal to each part of the image forming apparatus 100, and to cause the image forming apparatus 100 to perform various operations.

The image forming apparatus 100 has the configuration provided with the paper feeder 400 and the manual feed unit 510. However, the image forming apparatus 100 may have a configuration to be provided with an external paper feeder from which the sheet P is fed to the sheet conveying path W1.

Paper Feeder

The configuration of the paper feeder 400 according to the embodiment will be described, referring to FIGS. 2 to 5. The paper feeder 400 according to the embodiment will be described using, as an example, a paper feeder built into the lower portion of the image forming apparatus 100, but is not limited thereto. For example, the paper feeder 400 may be provided separately from the image forming apparatus 100.

Figure 2:
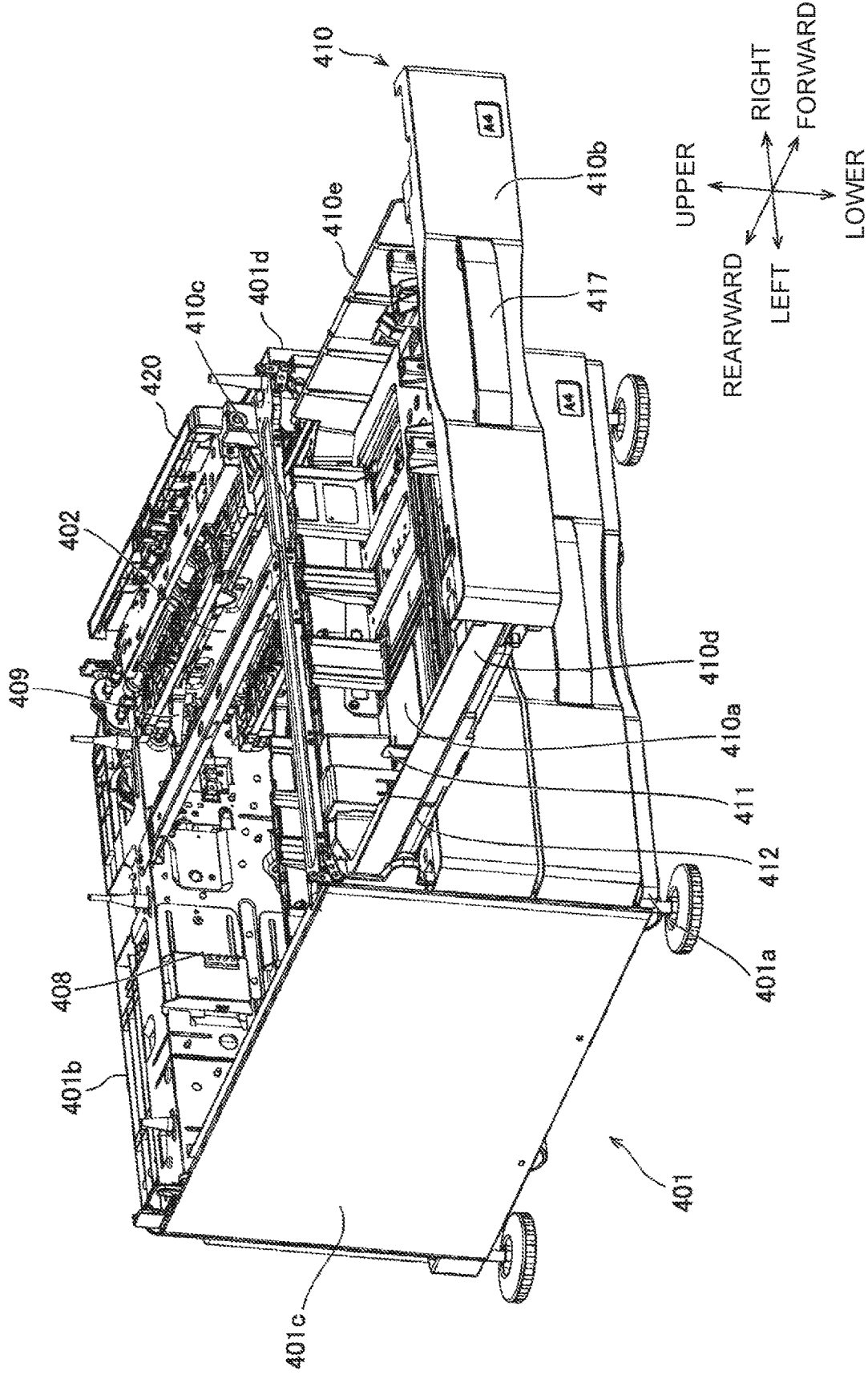
FIG. 2 is a perspective view of the paper feeder according to an embodiment.
Figure 3:
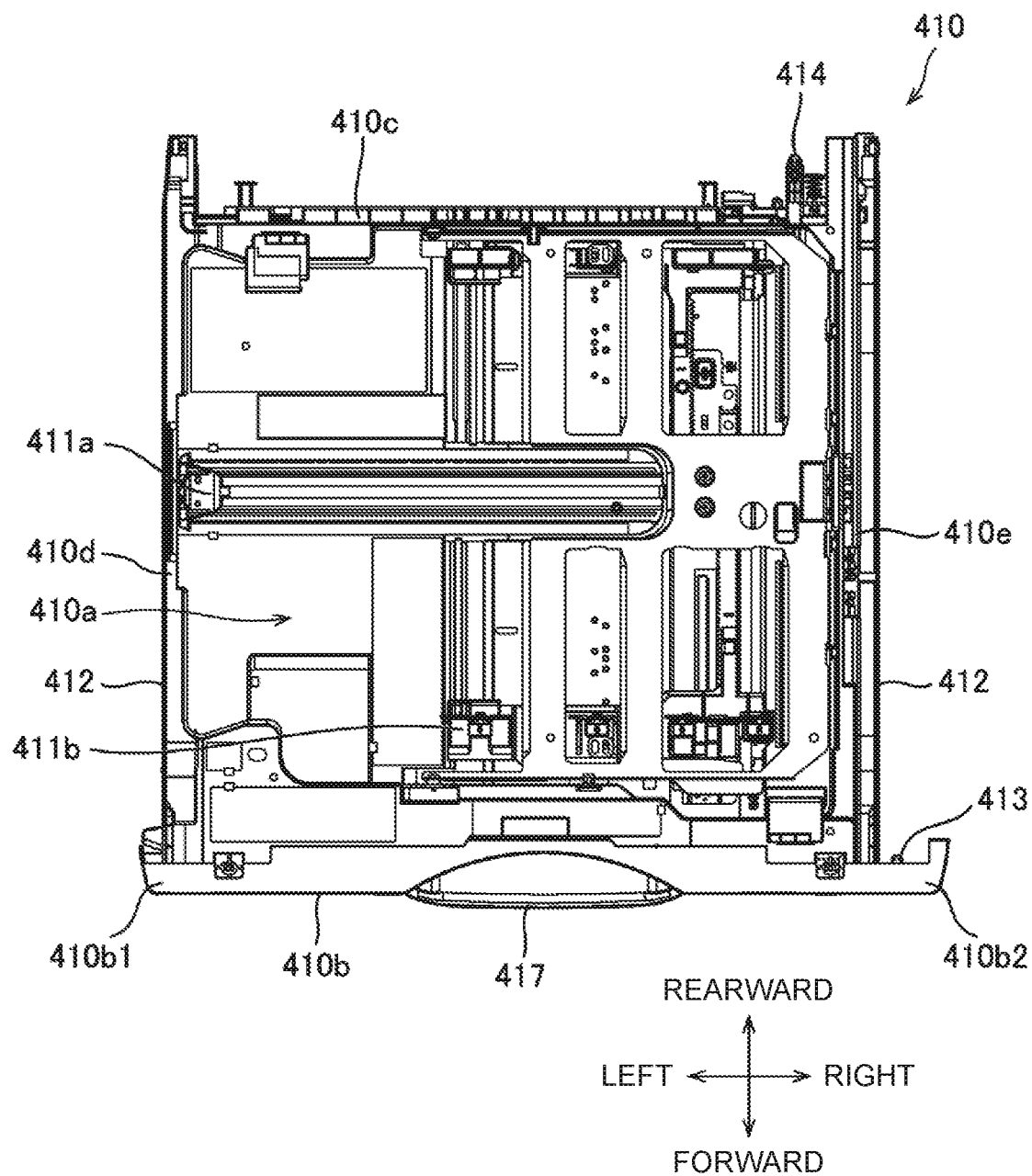
FIG. 3 is a plan view of the paper feed cassette provided in the paper feeder shown in FIG. 2, viewed from above.
Figure 4:
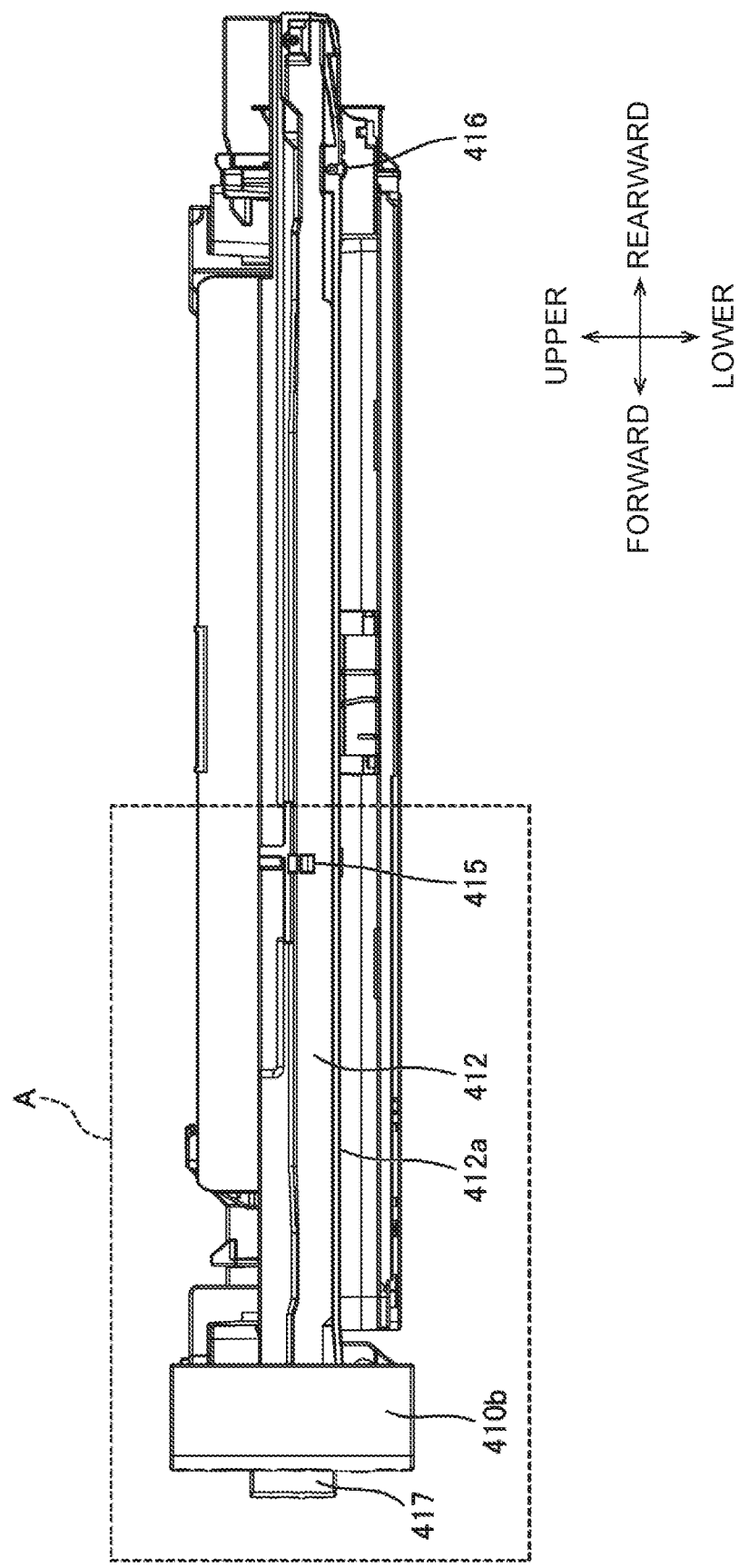
FIG. 4 is a side view of the paper feed cassette provided in the paper feeder shown in FIG. 2, viewed from the right side.
Figure 5:
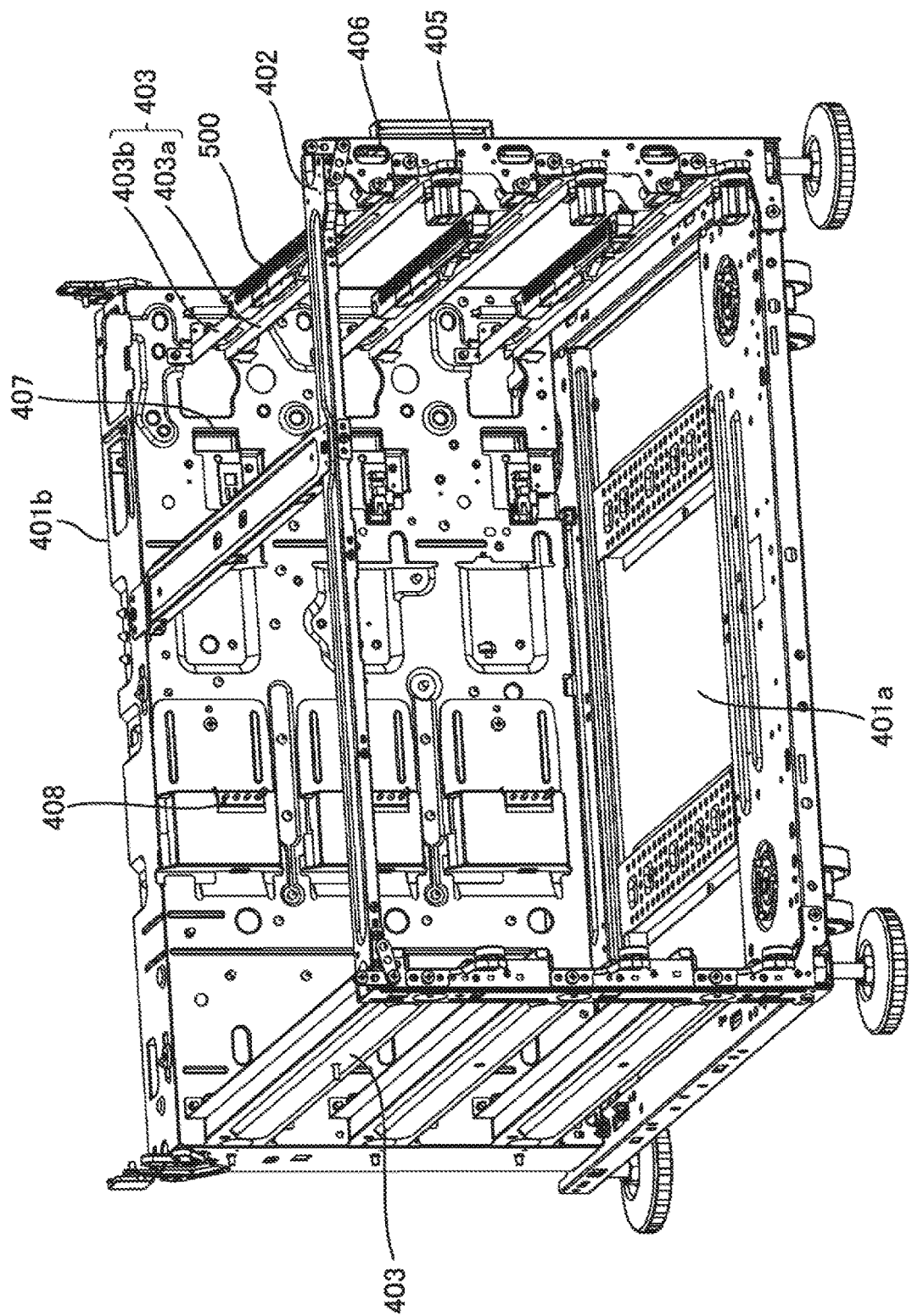
FIG. 5 is a perspective view of an internal configuration of the paper feeder main body provided in the paper feeder shown in FIG. 2.

FIG. 2 is a perspective view of the paper feeder 400 according to the embodiment. FIG. 3 shows a plan view of the paper feed cassette 410 provided in the paper feeder 400 shown in FIG. 2, viewed from above. FIG. 4 is a side view of the paper feed cassette 410 provided in the paper feeder 400 shown in FIG. 2, viewed from the right side. FIG. 5 is a perspective view of an internal configuration of a paper feeder main body 401 provided in the paper feeder 400 shown in FIG. 2.

FIG. 2 is a perspective view of the paper feeder 400 when viewed from the front side; among the horizontal directions when viewed from the front side, the left side is defined as the left direction, and the right side is defined as the right direction. Among the depth directions when viewed from the front side, the front side of the paper feeder 400 is defined as the forward direction, and the back side is defined as the rearward direction. In the paper feeder 400, the bottom side is defined as the downward direction and the opposite side is defined as the upward direction. FIG. 2 shows the paper feed cassette 410 in a state of being pulled out of the paper feeder main body 401. In FIG. 5, for easily understanding the internal configuration of the paper feeder main body 401, the left and right walls of the paper feeder 400 are omitted from the illustration.

As shown in FIG. 2, the paper feeder 400 has a substantially rectangular parallelepiped shape and is provided with the paper feeder main body 401 (main body) and the three paper feed cassettes 410. Each of the three paper feed cassettes 410 is provided so as to be pluggable (insertable and can be pulled out) in the forward-rearward direction (first direction) relative to the paper feeder main body 401. In the forward-rearward direction, the direction in which the paper feed cassette 410 is inserted into the paper feeder main body 401 is referred to as an inserting direction, whereas the direction in which the paper feed cassette 410 is pulled out of the paper feeder main body 401 is referred to as a pull-out direction of the paper feed cassette 410.

Paper Feed Cassette

As shown in FIGS. 2 and 3, the paper feed cassette 410 has a rectangular bottom 410a, a first cassette wall 410b standing upward from the bottom 410a along an outer periphery of the bottom 410a, a second cassette wall 410c, a third cassette wall 410d (second side wall), and a fourth cassette wall 410e (first side wall).

The first cassette wall 410b is connected to the front end edge of the bottom 410a, the second cassette wall 410c is connected to the rear end edge of the bottom 410a, the third cassette wall 410d is connected to the left end edge of the bottom 410a, and the fourth cassette wall 410e is connected to the right end edge of the bottom 410a, respectively; the bottom 410a, the first cassette wall 410b, the second cassette wall 410c, the third cassette wall 410d, and the fourth cassette wall 410e form a rectangular parallelepiped container with an upper face opened.

A plurality of sheets P is placed at a predetermined position in a sheet storage area surrounded by the bottom 410a, the first cassette wall 410b, the second cassette wall 410c, the third cassette wall 410d, and the fourth cassette wall 410e. For convenience of description, the sheet P is omitted in FIG. 3.

The sheet storage area has a first guide clip 411a and a second guide clip 411b for aligning the plurality of sheets P in a predetermined position. The first guide clip 411a and the second guide clip 411b each have a partitioning plate that rises upward from the bottom 410a. The partitioning plate of the first guide clip 411a is movable in the left-right direction, and the partitioning plate is moved thereby to contact the left side of the sheet P. The partitioning plate of the second guide clip 411b is movable in the forward-rearward direction (first direction), and the partitioning plate is moved thereby to contact the front side of the sheet P. In this way, the partitioning plate of the first guide clip 411a and the partitioning plate of the second guide clip 411b allow a plurality of sheets P to be placed in the predetermined position in the sheet storage area in an aligned manner.

In the embodiment of the present disclosure, although to be described below; when the paper feed cassette 410 is inserted into the paper feeder main body 401, the sheet feeder 420 is provided at a position that corresponds to the right side of the paper feed cassette 410 of the paper feeder main body 401. Due to this, with the paper feed cassette 410 in plan view, the sheet P is placed on the right side, of the paper feed cassette 410, than the center position in the left-right direction. Therefore, in the bottom 410a of the paper feed cassette 410, the gravitational center of the paper feed cassette 410 is on the right side than the center position in the left-right direction.

As shown in FIGS. 2 to 4, a pair of rails 412, which are in contact with the paper feeder main body 401, are provided on respective left and right sides of the paper feed cassette 410, i.e., on the respective outer faces of the third cassette wall 410d and the fourth cassette wall 410e, respectively. The rail 412 provided at the third cassette wall 410d protrudes from the third cassette wall 410d to the left side, and is a guard member extending in the forward-rearward direction. Further, the rail 412 provided at the fourth cassette wall 410e protrudes from the fourth cassette wall 410e to the right side, and is a guard member extending in the forward-rearward direction. The rail 412 provided at the fourth cassette wall 410e is, as shown in FIG. 4, provided, at a substantially intermediate position of the rail 412, with a protrusion 415 to engage with an after-described pull-in unit 500.

For example, as shown in FIG. 4, a paper feed cassette-directed roller 416 is provided at the rear position of each of the pair of rails 412. The paper feed cassette-directed roller 416 is a cylindrical rotational member that contacts the guide frame 403 so as to facilitate the inserting and pulling-out of the paper feed cassette 410. The paper feed cassette-directed roller 416 can assist in the forward-rearward movement of the paper feed cassette 410. Details of the rail 412 will be described below.

As shown in FIG. 3, the first cassette wall 410b of the paper feed cassette 410 has a first flange 410b1 that protrudes to the left of a position for jointing with the third cassette wall 410d, and a second flange 410b2 that protrudes to the right of position for jointing with the fourth cassette wall 410e. The second flange 410b2 is provided with a first boss 413 (protrusion) which is a rod-shaped member protruding toward the rearward direction (inserting direction).

Further, near a position for jointing with the fourth cassette wall 410e, the second cassette wall 410c is provided with a second boss 414 (protrusion) which is a rod-shaped member protruding toward the rearward direction.

Although to be described below, the paper feeder main body 401 has a first boss hole 406 (hole) through which the first boss 413 is inserted and a second boss hole 407 (hole) through which the second boss 414 is inserted. The first boss 413 is inserted into the first boss hole 406, and the second boss 414 is inserted into the second boss hole 407, thereby making it possible to align the paper feed cassette 410 in the paper feeder main body 401.

In the substantially center portion of the first cassette wall 410b of the paper feed cassette 410, a grip 417 is provided in a manner to protrude to the front side. Gripping this grip 417, a user can insert the paper feed cassette 410 into the paper feeder main body 401 or pull the paper feed cassette 410 out of the paper feeder main body 401.

Paper Feeder Main Body

As shown in FIGS. 2 and 5, the paper feeder main body 401 has a substantially rectangular parallelepiped shape with the upper side and the front side opened. When the paper feeder 400 is provided separately from the image forming apparatus 100, the upper side may be blocked by an upper wall.

The paper feeder main body 401 includes a rectangular paper feeder bottom 401a, and a rear wall 401b, a left side wall 401c and a right wall 401d which stand upward from the paper feeder bottom 401a along an outer periphery of the paper feeder bottom 401a. The rear wall 401b is connected to the rear end edge of the paper feeder bottom 401a, the left side wall 401c is connected to the left end edge of the paper feeder bottom 401a, and the right wall 401d is connected to the right end edge of the paper feeder bottom 401a, respectively; the paper feeder bottom 401a, the rear wall 401b, the left side wall 401c, and the right wall 401d form a housing body having a substantially rectangular parallelepiped shape with the upper side and the front side opened. Then, it is configured so that the paper feed cassette 410 is inserted into or pulled out of the inside of the paper feeder main body 401 through the front opening.

As shown in FIG. 2, the paper feeder main body 401 has the sheet feeder 420 provided on the right wall 401d. Due to this, as described above, in the paper feed cassette 410, the sheet storage area where the sheet P is placed is positioned to the right of the center position of the paper feed cassette 410.

As shown in FIG. 5, the above first boss hole 406 is formed on a frame side on the right side of a frame body 402 that forms an opening in the front of the paper feeder main body 401. Further, the above second boss hole 407 is formed in the rear wall 401b. In the present embodiment, the paper feeder 400 is provided with the three paper feed cassettes 410. Due to this, the first boss holes 406 and the second boss holes 407 are formed in the positions that correspond to the respective paper feed cassettes 410.

Figure 6:
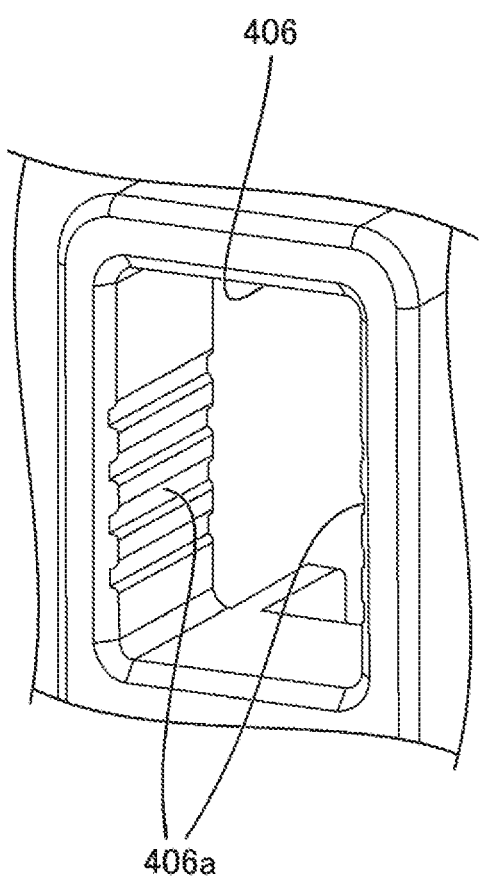
FIG. 6 is a perspective view showing a first boss hole in the paper feeder main body.

As shown in FIG. 6, the inner face of the first boss hole 406 is formed with an irregularity 406a including a plurality of concaves/convexities. FIG. 6 is a perspective view showing the first boss hole 406 formed in the paper feeder main body 401. As shown in FIG. 6, the first boss hole 406 has the irregularity 406a on a part of the left and right walls, among the inner periphery of the first boss hole 406.

In this way, the inner periphery of the first boss hole 406 has irregularity 406a, thus making it possible to reduce the contact area between the first boss hole 406 and the first boss 413. Therefore, a load at the time of inserting the first boss 413 into the first boss hole 406 can be reduced.

Although not shown, the second boss hole 407, like the first boss hole 406, is also formed with concaves/convexities on the inner face of the second boss hole 407. Due to this, the contact area between the second boss hole 407 and the second boss 414 can be reduced, making it possible to reduce a load at the time of inserting the second boss 414 into the second boss hole 407.

Further, as shown in FIG. 5, inside the left side wall 401c and right wall 401d of the paper feeder main body 401, there is provided a pair of guide frames 403 that extends in the forward-rearward direction (first direction) and that can guide, to the mounting position, the paper feed cassette 410 inserted into the paper feeder main body 401. The mounting position is a predetermined position defined when the paper feed cassette 410 is mounted on the paper feeder main body 401. When the paper feed cassette 410 is in the mounting position, the sheet P stored in the paper feed cassette 410 is in a predetermined paper feed position.

The pair of guide frames 403 is rod members that are arranged in a manner to span between the left and right frame sides of the frame body 402 and the rear wall 401b, and extend in the forward-rearward direction. As shown in FIG. 5, the guide frame 403 has a lying rectangular U-shaped cross section, and a sliding face 403a on which the paper feed cassette-directed roller 416 moves is formed in the lower portion of the guide frame 403. This sliding face 403a supports the paper feed cassette 410 from below and allows the paper feed cassette 410 to move in the forward-rearward direction.

Further, the pull-in unit 500 (pull-in device) is provided on an upper face 403b of the right guide frame 403 of the pair of guide frames 403. In the present embodiment, the pull-in unit 500 is configured so as to be provided on the paper feeder main body 401 via the guide frame 403, but is not limited to this configuration. For example, the pull-in unit 500 may be configured to be provided directly on the inside of the right wall 401d of the paper feeder main body 401.

The pull-in unit 500 engages with the paper feed cassette 410 inserted into the paper feeder main body 401, and exerts a force to pull the paper feed cassette 410 toward the rearward direction side, that is, toward the inserting direction side. This allows the pull-in unit 500 to pull in the paper feed cassette 410 to the mounting position. Due to this, when inserting the paper feed cassette 410 into the paper feeder main body 401, a user can reduce a burden for pushing the paper feed cassette 410 into the paper feeder main body 401. Details of the pull-in unit 500 will be described below.

Further, each of the front ends of the sliding faces 403a of the pair of guide frames 403 (the paper feed cassette 410's end on the pull-out direction side) is provided with a roller 405 (support member). The roller 405 is a rotational body that rotates so that the paper feed cassette 410 can move relative to the guide frame 403 in the forward-rearward direction. With the axis, that extends in a direction perpendicular to the forward-rearward direction in a horizontal direction, as a rotational axis, the roller 405 makes a rotation. Due to this, the rail 412, by contacting the roller 405, can assist in moving the paper feed cassette 410 in the forward-rearward direction. Due to this, the roller 405 can facilitate the inserting and pulling-out of the paper feed cassette 410.

In the paper feeder main body 401, the roller 405 is provided at the front end of the guide frame 403, but the location of providing the roller 405 is not limited to this. In the forward-rearward direction, for example, at a position adjacent to the front end of the guide frame 403, the roller 405 may be rotatably provided on a member separate from the guide frame 403.

As shown in FIG. 2, a switch lever 409 is provided above the rear side of the right guide frame 403 in the lower portion of the sheet feeder 420. The switch lever 409 is a member for switching between a pressing state in which the separation roller 423 is pressed on the feed roller 422 and a releasing state in which this pressing state is released. The switch lever 409 is provided so as to be pivotable in the horizontal direction. That is, when the paper feed cassette 410 is inserted into the paper feeder main body 401 and the paper feed cassette 410 contacts the switch lever 409, the switch lever 409 moves from its initial position toward the rear. In this way, it is configured so that, when the switch lever 409 moves toward the rear, the separation roller 423 presses the feed roller 422. Meanwhile, when the paper feed cassette 410 is pulled out of the paper feeder main body 401 and thereby the paper feed cassette 410 moves away from the switch lever 409, the switch lever 409 moves forward and returns to its initial position. Thus, it is configured so that, when the switch lever 409 returns to its initial position, the separation roller 423's pressing on the feed roller 422 is released.

As shown in FIG. 2, a size detection switch 408, which detects the size of the sheet P, is provided on the rear wall 401b of the paper feeder main body 401. The size detection switch 408 is provided with a plurality of detectors protruding from the rear wall 401b to the front side. With the sheet P in contact with this detector, the size detection switch 408 can detect the size of the sheet P.

Pull-In Unit

Figure 7:
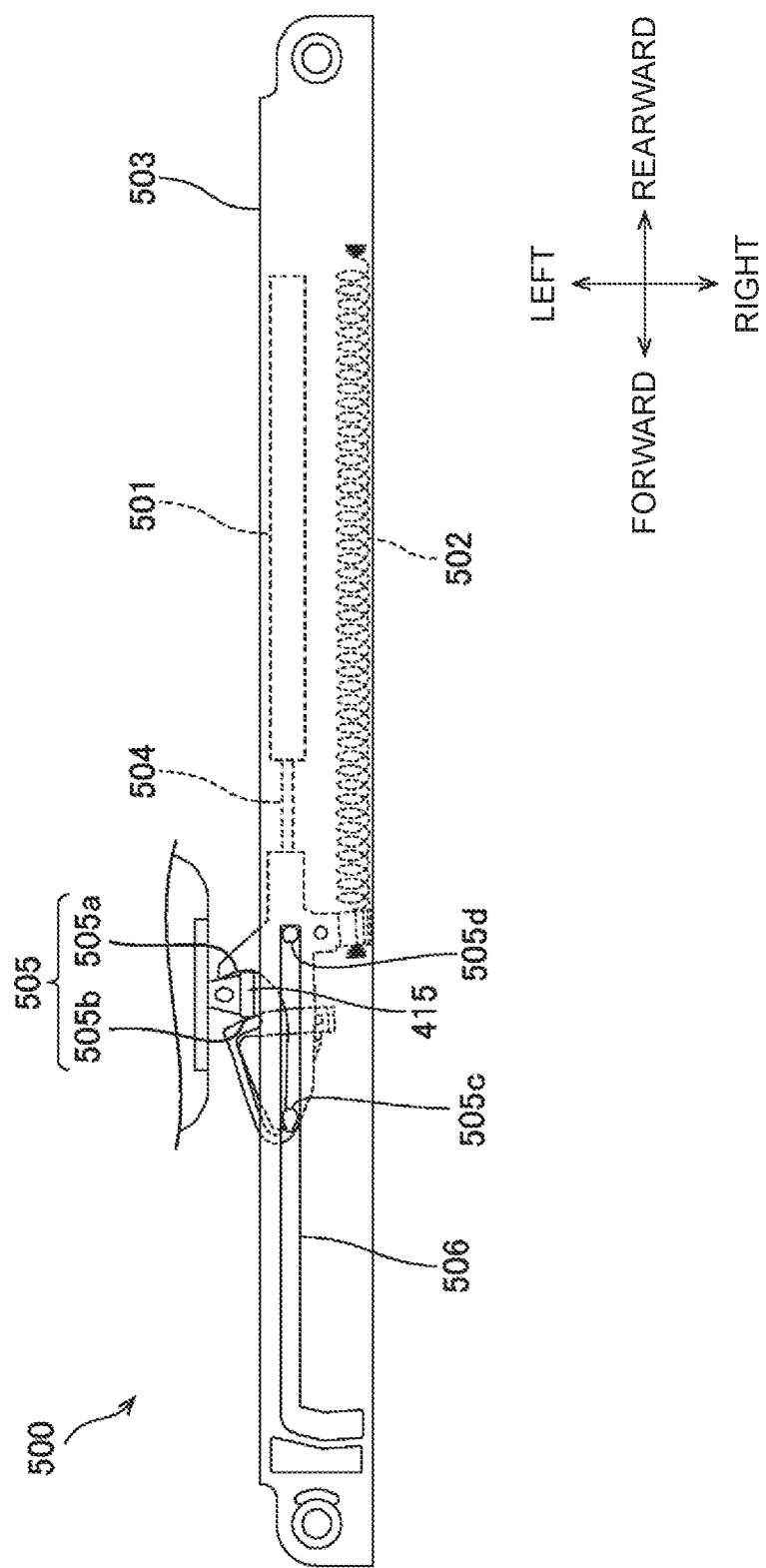
FIG. 7 is a plan view of an internal configuration of a pull-in unit provided in the paper feeder main body.
Figure 8:
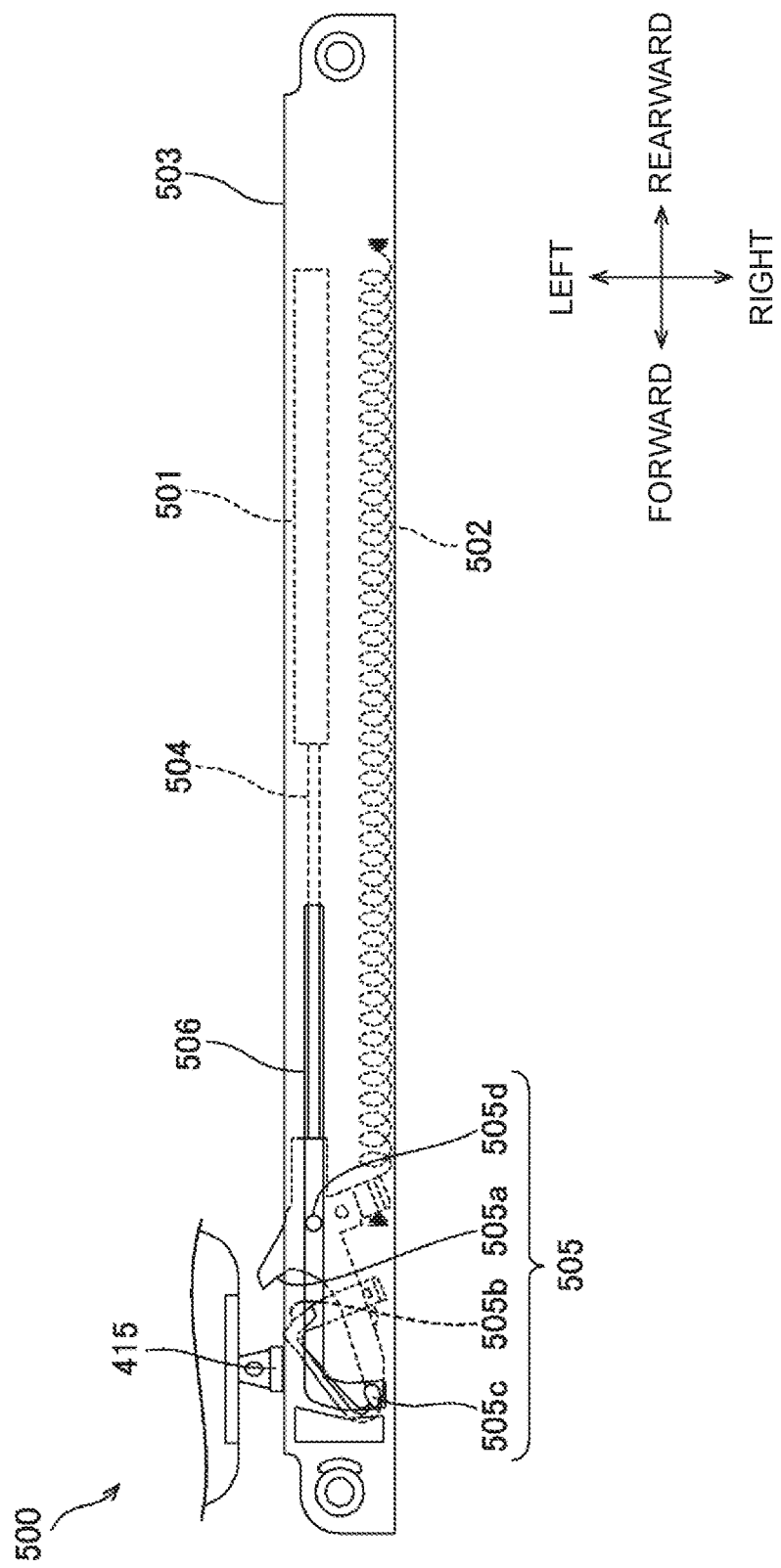
FIG. 8 is a plan view of the internal configuration of the pull-in unit provided in the paper feeder main body according to an embodiment.

Then, the pull-in unit 500 will be described referring to FIGS. 7 and 8. FIGS. 7 and 8 are each a plan view of an internal configuration of the pull-in unit 500 in the paper feeder main body 401 according to the present embodiment. FIG. 7 shows a state seen when an engaging member 505 of the pull-in unit 500 is at the most rearward position, and FIG. 8 shows a state seen when the engaging member 505 of the pull-in unit 500 is at the most forward position.

As shown in FIGS. 7 and 8, the pull-in unit 500 is configured to include a damper 501, a spring 502, and a housing body 503 that stores the damper 501 and the spring 502. The damper 501 is configured so that a piston (not shown) reciprocates in the forward-rearward direction in a case filled with fluid (e.g., oil). The damper 501 is provided with a rod 504 that extends in the forward-rearward direction and protrudes from the front end of the case. The rod 504 extends in the forward-rearward direction; with the end on the case side defined as a base end and the end on the opposite side of the base end defined as a tip, the tip is provided with the engaging member 505, and the base end is joined with the piston.

The spring 502 is, for example, a coil spring, and the rear end thereof is fixed inside the housing body 503, and the front end thereof is connected to the tip of the rod 504. By the way, the tip of the rod 504 is configured so as to move in the forward-rearward direction relative to the case of the damper 501. Due to this, the spring 502, fixed to the tip of the rod 504, expands and contracts in response to the forward and rearward movement of the rod 504.

The engaging member 505 has a first contact 505a that has a contact with the protrusion 415 of the paper feed cassette 410 at the time of inserting the paper feed cassette 410 into the paper feeder main body 401, and a second contact 505b that has a contact with the protrusion 415 of the paper feed cassette 410 at the time of pulling the paper feed cassette 410 from inside the paper feeder main body 401 to the outside. The first contact 505a and the second contact 505b are provided so as to protrude from the left side of the housing body 503.

The engaging member 505 is further provided with a first guide shaft 505c and a second guide shaft 505d that engage with guide slits 506 formed on the housing body 503. The first guide shaft 505c is provided on the front side of the engaging member 505, and the second guide shaft 505d is provided on the rear side of the engaging member 505, respectively. And, the first guide shaft 505c and the second guide shaft 505d are configured so as to move along the guide slit 506. Therefore, the movement of the engaging member 505 is restricted by the guide slit 506.

The guide slit 506 is a substantially L-shaped slit that, along the left side of the housing body 503, extends from substantially the middle of the housing body 503 toward the front and bends toward the right near the front end of the housing body 503.

Therefore, as shown in FIGS. 7 and 8, when the engaging member 505 moves from the rear side to the front side, the engaging member 505 moves along the left side of the housing body 503. Then, near the front end of the housing body 503, the first guide shaft 505c moves toward the right side of the housing body 503 along the guide slit 506, and pulls the second contact 505b into the housing body 503. Then, the first guide shaft 505c is engaged at the end of the guide slit 506.

This causes the second contact 505b of the engaging member 505 to be stored in the housing body 503 at the front end of the housing body 503, releasing the engagement between the protrusion 415 of the paper feed cassette 410 and the engaging member 505.

Specifically, when pulling the paper feed cassette 410 from inside the paper feeder main body 401 toward the outside, the protrusion 415 of the paper feed cassette 410 contacts and engages with the second contact 505b. Then, a force exerted by the user to pull out the paper feed cassette 410 causes the engaging member 505, which is engaged with the protrusion 415, to move toward the forward direction. At this time, the tip of the rod 504 moves forward, causing the spring 502 to extend forward.

When the engaging member 505 moves to the vicinity of the tip of the pull-in unit 500, as described above, the second contact 505b is stored in the housing body 503, releasing the engagement between the protrusion 415 and the second contact 505b. This causes the paper feed cassette 410 to move forward, away from the pull-in unit 500, and the paper feed cassette 410 is pulled from inside the paper feeder main body 401 to the outside.

Meanwhile, when the paper feed cassette 410 is to be inserted into the paper feeder main body 401; since the second contact 505b of the pull-in unit 500 is stored in the housing body 503, the protrusion 415 of the paper feed cassette 410 contacts and engages with the first contact 505a without being obstructed by the second contact 505b. Then, the user's force exerted to push in the paper feed cassette 410 causes the protrusion 415 to press the first contact 505a in the rearward direction releases the engagement of the first guide shaft 505c.

Releasing the engagement of the first guide shaft 505c allows a restoring force of the stretched spring 502 to move the engaging member 505 from the front side to the rear side, that is, toward the inserting direction. At the time of moving of the engaging member 505, the second contact 505b presses the protrusion 415 toward the inserting direction. This pressing force from the second contact 505b pushes the protrusion 415 in the inserting direction, resulting in the paper feed cassette 410 being pulled into the paper feeder main body 401. In this way, the paper feed cassette 410 is pulled into the paper feeder main body 401 mainly by the restoring force of the spring 502.

Therefore, when the user pushes the paper feed cassette 410 to the position where the protrusion 415 contacts the first contact 505a, the paper feed cassette 410 is then pulled into the paper feeder main body 401 by the pull-in unit 500. Hence, the user can reduce the burden for inserting the paper feed cassette 410 into the paper feeder main body 401.

By the way, when the paper feed cassette 410 is to be inserted into the paper feeder main body 401, various loads exert a force in a direction that prevents the paper feed cassette 410 from moving. For example, such a load includes the switch lever 409 or the size detection switch 408 described above. Further, such a load includes a coupling mechanism or the like that connects to a lift-up shaft in a lift-up mechanism that raises and lowers, to a predetermined paper feed opening height, the sheet P stored in the paper feed cassette 410.

As described above, the pull-in unit 500 is configured to use the restoring force of the spring 502 thereby to pull in the paper feed cassette 410 to the mounting position. Therefore, the magnitude of the force with which the pull-in unit 500 pulls in the paper feed cassette 410 reduces as the paper feed cassette 410 approaches the mounting position.

Therefore, to ensure that the paper feed cassette 410 is moved to the mounting position by the pull-in unit 500, it is necessary to consider the magnitude of the force to pull in the paper feed cassette 410 by the pull-in unit 500 and the influence of the load generated when moving the paper feed cassette 410.

Here, a paper feeder according to a comparative example having a configuration similar to that of the paper feeder 400 according to the present embodiment was prepared, and the relation between the pull-in force of the paper feed cassette by the pulling unit and the force required to move the paper feed cassette to the mounting position has been examined.

The paper feeder according to the comparative example has a configuration similar to that of the paper feeder 400 according to the embodiment, except that the shape of the rail of the paper feed cassette is different. That is, in the paper feeder according to the comparative example, the rails are provided so as to extend, at the same height, from the front end to the rear end of the paper feed cassette.

Figure 9:
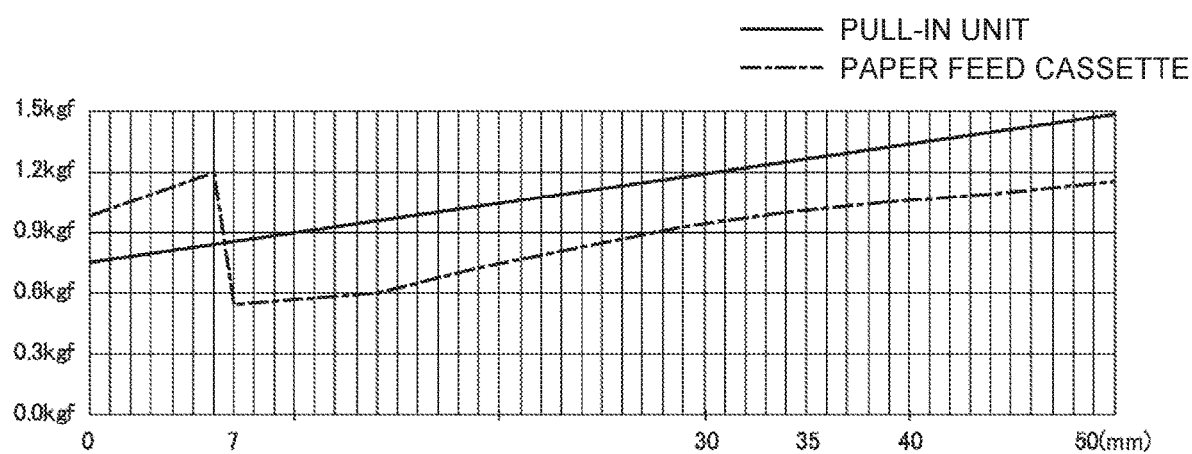
FIG. 9 is a graph showing the relation between the pull-in force of the pull-in unit and the force required to pull in the paper feed cassette to the mounting position, in the paper feeder according to the comparative example of the embodiment.

As shown in FIG. 9, in the paper feeder according to the comparative example, the pull-in force to pull in the paper feed cassette to the mounting position by the pull-in unit, as the case may be, is smaller, due to an influence such as a load, than the force required to pull in the paper feed cassette to the mounting position. FIG. 9 is a graph showing the relation between the pull-in force of the pull-in unit and the force required to pull in the paper feed cassette to the mounting position, in the paper feeder according to the comparative example. In FIG. 9, the change in the magnitude of the pull-in force of the pull-in unit of the paper feeder according to the comparative example is shown as a solid line, and the change in the magnitude of the force required to pull in the paper feed cassette to the mounting position is shown as a single dotted line.

Hereinafter, the pull-in force of the pull-in unit is referred to as a first force, and the force required to pull in the paper feed cassette to the mounting position is referred to as a second force.

In FIG. 9, the abscissa shows the distance between the mounting position of the paper feed cassette provided in the paper feeder according to the comparative example and the paper feed cassette. That is, when the paper feed cassette is in the mounting position, the position of the rear wall is set to 0 mm. And, the abscissa shows how far away the rear wall is from the mounting position thereof. Meanwhile, the ordinate shows the magnitude of the first and second forces, respectively. FIG. 9 shows the change in the first and second forces in the range where the distance between the rear wall and the mounting position is from 0 mm to 50 mm. The graph showing the change in the second force in FIG. 9 has been obtained through a measurement with 500 A3 size sheets stored in the paper feed cassette (the maximum paper size and the maximum number of sheets that can be stored).

As shown in FIG. 9, the first force in the paper feeder according to the comparative example becomes smaller as toward the mounting position. That is, the restoring force of the spring of the pull-in unit reduces as the paper feed cassette approaches the mounting position. Meanwhile, until the distance between the paper feed cassette and the mounting position is about 7 mm, the magnitude of the second force in the paper feeder according to the comparative example does not exceed the magnitude of the first force, and gradually reduces in the same manner as the first force. The factor that reduces the magnitude of the second force is that, with the position where the rail contacts the roller on the guide frame defined as a fulcrum, the relative position between the rail and the fulcrum changes. That is, as the paper feed cassette moves toward the mounting position, the distance from the fulcrum to the rear end of the paper feed cassette gradually increases. Due to this, as the paper feed cassette moves toward the mounting position by the principle of leverage, the force required to support the paper feed cassette substantially horizontally becomes smaller, which is the above factor.

However, when the distance between the paper feed cassette and the mounting position is about 6 mm, the magnitude of the second force exceeds the magnitude of the first force due to the influence of various loads as described above. Thus, when the magnitude of the first force is smaller than the magnitude of the second force in the paper feeder, the paper feed cassette may not be pulled in to the mounting position by the pull-in unit and may not be appropriately positioned in the mounting position.

So as to ensure that the paper feed cassette is placed in the mounting position, there is presumed a configuration that increases a tensile force of the spring provided by the pull-in unit thereby to increase the magnitude of the first force described above. However, in the configuration of increasing the tensile force of the spring, a still larger force is required when the user pulls out the paper feed cassette from the paper feeder main body, increasing the burden on the user.

Therefore, the paper feeder 400 according to the embodiment is configured so that devising the shape of the rail 412 of the paper feed cassette 410 allows the pull-in unit 500 to securely pull in the paper feed cassette 410 to the mounting position.

Specifically, the shape of a contact face 412a of the rail 412, among a pair of rails 412, that is provided at least the fourth cassette wall 410e is devised. In the left-right direction of the paper feed cassette 410, the fourth cassette wall 410e is a wall close to the paper feed cassette 410's gravitational center observed when the sheet P is placed. Further, a contact face 412a of the rail 412 provided at the third cassette wall 410d may be the same in shape as the contact face 412a of the rail 412 provided at the fourth cassette wall 410e. Alternatively, the contact face 412b of the rail 412 provided at the third cassette wall 410d may be shaped so as to extend straight in the forward-rearward direction at an after-described reference height.

Hereinafter, the rail 412 provided at the fourth cassette wall 410e will be described.

Rail 412

The configuration of the rail 412 provided at the fourth cassette wall 410e of the paper feed cassette 410 provided at the paper feeder 400 according to the embodiment will be described, referring to FIGS. 10 to 13.

Figure 10:
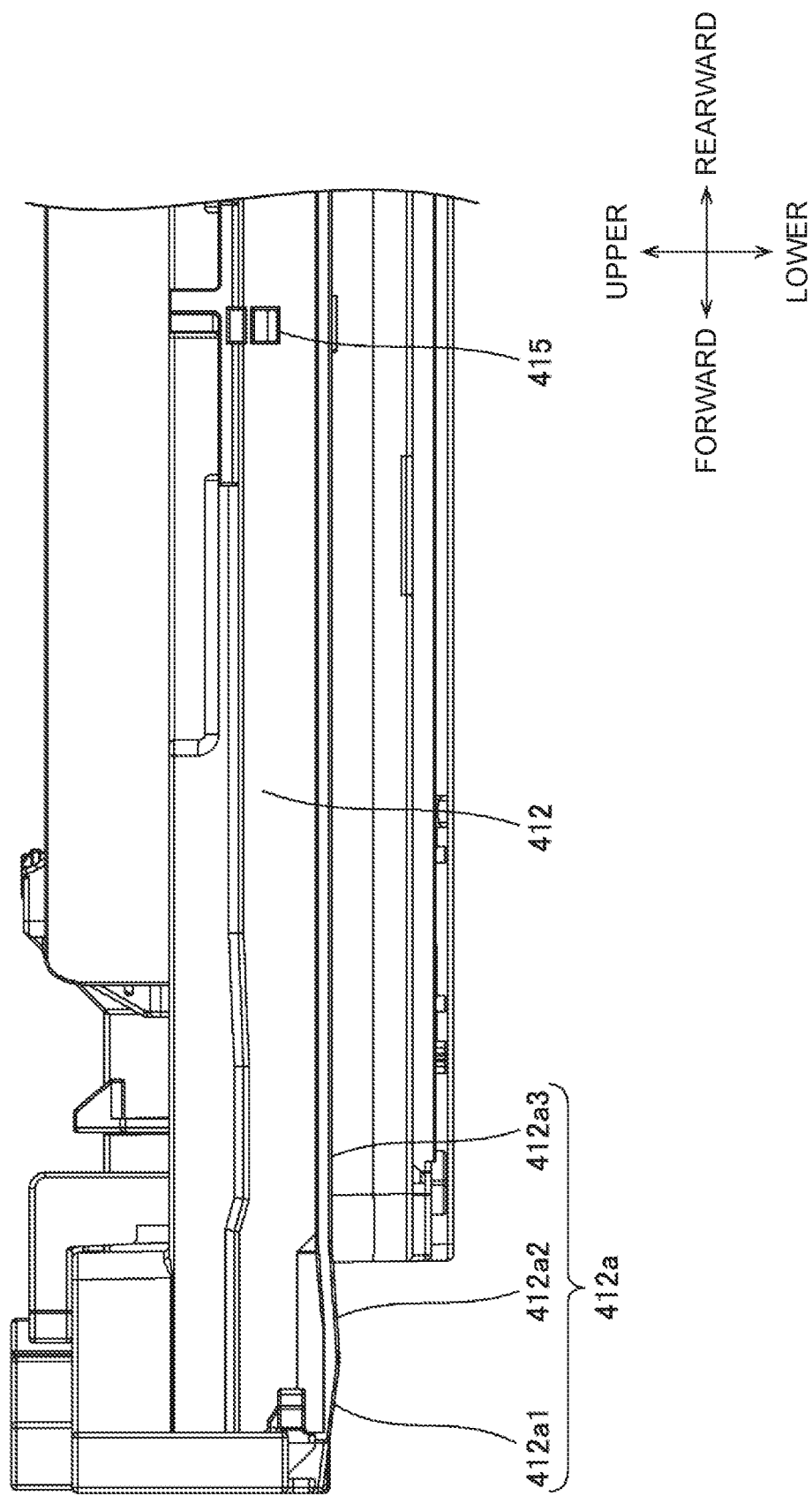
FIG. 10 is a partially enlarged view of the paper feed cassette shown in an area A shown in FIG. 4.
Figure 11:
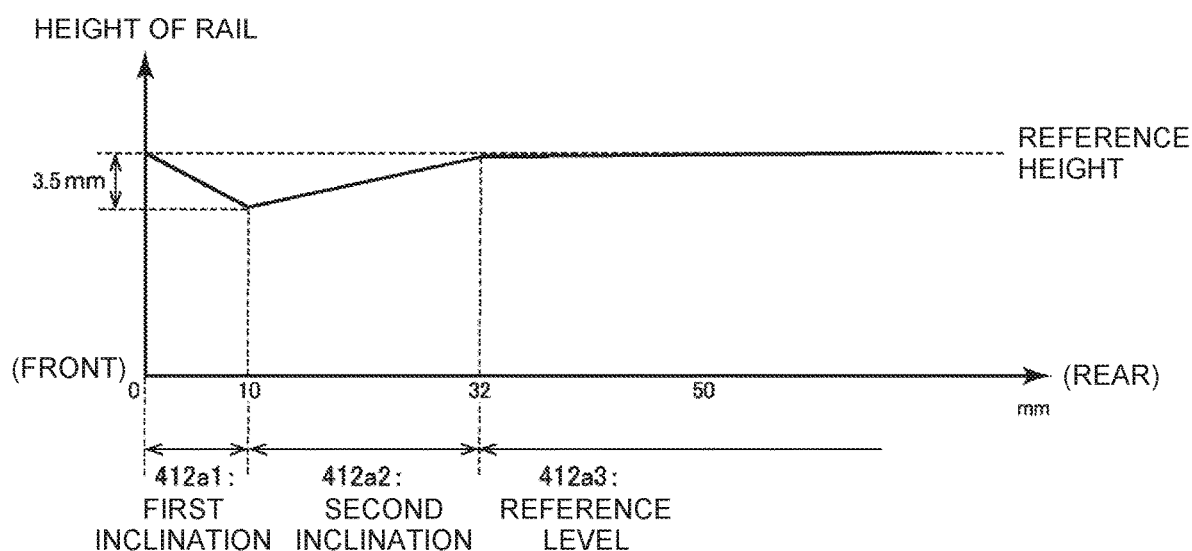
FIG. 11 schematically shows the height difference of the rail of the paper feed cassette shown in FIG. 10.
Figure 12:
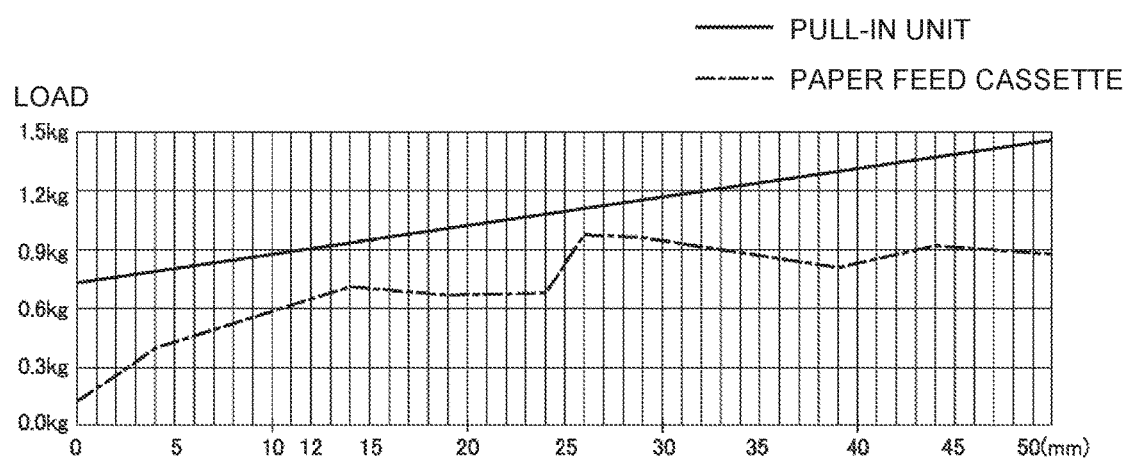
FIG. 12 is a graph showing the relation between the pull-in force of the pull-in unit and the force required to pull in the paper feed cassette to the mounting position, in the paper feeder according to the embodiment.
Figure 13:
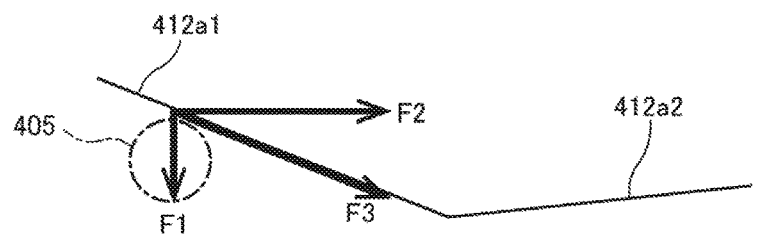
FIG. 13 schematically shows a principle of generating a force to pull in, to the mounting position, the paper feed cassette provided in the paper feeder according to the embodiment.

FIG. 10 is a partially enlarged view of the paper feed cassette 410 in an area A shown in FIG. 4. FIG. 11 schematically shows the height difference of the rail 412 of the paper feed cassette 410 shown in FIG. 10. FIG. 12 is a graph showing the relation between the pull-in force of the pull-in unit 500 and the force required to pull in the paper feed cassette 410 to the mounting position, in the paper feeder 400 according to the embodiment. FIG. 13 schematically shows a principle of generating a force to pull in, to the mounting position, the paper feed cassette 410 provided in the paper feeder 400 according to the embodiment.

For convenience of description, FIG. 10 omits the first cassette wall 410b and the grip 417. In FIG. 11, the abscissa shows the horizontal distance (mm) starting from the front end of the rail 412, and the ordinate shows the vertical distance (mm) from the bottom 410a of the paper feed cassette 410 to the contact face 412a of the rail 412.

In FIG. 12, change in the pull-in force of the pull-in unit 500 of the paper feeder 400 (first force) is shown as a solid line, and the change in the force required to pull in the paper feed cassette 410 to the mounting position (second force) is shown as a single dotted line. The abscissa of FIG. 12 shows the distance between the mounting position of the paper feed cassette 410 provided in the paper feeder 400, and the paper feed cassette 410. That is, when the paper feed cassette 410 is in the mounting position, the position of the second cassette wall 410c is set to 0 mm. And, the abscissa shows how far away the second cassette wall 410c is from the mounting position thereof. Meanwhile, the ordinate shows the magnitude of the first and second forces, respectively. FIG. 12 shows the change in the first and second forces in the range where the distance between the second cassette wall 410c and the mounting position is from 0 mm to 50 mm. The graph showing the change in the second force in FIG. 12 has been obtained through a measurement with 500 A3 size sheets P stored in the paper feed cassette 410 (the maximum paper size and the maximum number of sheets that can be stored).

In the embodiment of the present disclosure, when the paper feed cassette 410 is inserted into the paper feeder main body 401 and the rear end of the paper feed cassette 410 is pushed forward from the mounting position to a position 50 mm away from the mounting position (pull-out direction), the engaging member 505 of the pull-in unit 500 engages with the protrusion 415 of the paper feed cassette 410, causing the pull-in unit 500 to start pulling in the paper feed cassette 410.

As shown in FIGS. 10 and 11, the rail 412 has the contact face 412a that contacts the roller 405 provided on the guide frame 403. This contact face 412a includes a first inclination 412a1, a second inclination 412a2, and a reference level 412a3. The first inclination 412a1 and the second inclination 412a2 are provided in an area (first range) where the contact face 412a of the rail 412 and the roller 405 are in contact during the time when the paper feed cassette 410 is pulled in the inserting direction by the pull-in unit 500.

The first inclination 412a1 is an inclined face that, in the forward-rearward direction, becomes lower toward the inserting direction of the paper feed cassette 410.

In the present embodiment, as shown in FIG. 11, the first inclination 412a1, in the rail 412, is provided so as to be inclined to be 3.5 mm lower than the reference height from the front end to the position 10 mm away in the rearward direction. The height of the rail 412 with the paper feed cassette 410 in the mounting position, in other words, the height of the reference level 412a3 is defined as the reference height. Further, when the paper feed cassette 410 is in the mounting position is defined as a state where, with the first boss 413 inserted into the first boss hole 406 and the second boss 414 inserted into the second boss hole 407, respectively, the paper feed cassette 410 is aligned in the paper feeder main body 401, and the paper feed cassette 410 can be fed. The height of the front end of the rail 412 matches this reference height. In the paper feeder 400 according to the embodiment, the height difference of the first inclination 412a1 is set to be 3.5 mm, but is not limited to this. For example, the height difference of the first inclination 412a1 can be appropriately set between 1.5 mm and 4.5 mm.

The second inclination 412a2 is an inclined face that, in the forward-rearward direction, is inclined from a position 10 mm away in the rearward direction from the front end of the rail 412 to a position further 22 mm away (32 mm away from the front end in the rearward direction) in a manner to return to the reference height. That is, the second inclination 412a2 is connected to the first inclination 412a1's end in the inserting direction side, and is inclined so as to be higher toward the inserting direction.

The second inclination 412a2 is an inclination to compensate for the height difference between the first inclination 412a1 and the reference level 412a3 (reference height) so as to provide the first inclination 412a1 in the rail 412. However, when the lowest position of the first inclination 412a1 is the reference height, the second inclination 412a2 can be omitted.

In this way, the contact face 412a of the rail 412 includes the first inclination 412a1, the second inclination 412a2, and the reference level 412a3. Then, when the roller 405 of the guide frame 403 contacts the first inclination 412a1 of the rail 412, the paper feed cassette 410's own weight can generate a force to pull in the paper feed cassette 410, as shown in FIG. 13.

That is, when the first inclination 412a1 of the rail 412 contacts the roller 405, in the position of the contact therebetween, a load exerted from the paper feed cassette 410 (a force F1 downward in the vertical direction), a force that pulls in the paper feed cassette 410 toward the mounting position (a force F2 on the inserting direction side in the forward-rearward direction), and a force that, with the first inclination 412a1 contacting the roller 405, causes the paper feed cassette 410 to move toward the inserting direction (force F3) are caused. In this case, the force F3 corresponds to a combined force of the force F1 and the force F2.

Therefore, at the position where the first inclination 412a1 of the rail 412 contacts the roller 405 of the guide frame 403, the force F2 to pull in the paper feed cassette 410 toward the mounting position can be generated.

By the way, the paper feeder 400 is configured so that, when the paper feed cassette 410 is in the mounting position, the front end of the rail 412 matches the front end of the guide frame 403. Further, the first inclination 412a1 is provided within the range of 10 mm in the rearward direction from the front end of the rail 412, as described above.

Therefore, in the range where the distance between the paper feed cassette 410 and the mounting position is 10 mm or less, the first inclination 412a1 contacts the roller 405 of the guide frame 403. Therefore, as shown in FIG. 9, in the range where the first force is smaller than the second force, the pull-in force generated by the first inclination 412a1 can be used.

Therefore, as shown in FIG. 12, despite the range where the distance between the paper feed cassette 410 and the mounting position is 10 mm or less, the paper feeder 400 according to the embodiment can prevent the force to pull in the paper feed cassette 410 (first force) from being smaller than the force required to move the paper feed cassette 410 to the mounting position (second force).

In the case of pulling the paper feed cassette 410 out of the paper feeder main body 401, conversely, the first inclination 412a1 contacts the roller 405 and moves from the bottom to the top, thus allowing the rail 412 to generate a force that obstructs the force acting in the pull-out direction. However, in the range where the distance between the mounting position and the paper feed cassette 410 is 10 mm, the tensile force of the spring 502 of the pull-in unit 500 is small. Therefore, in the case of pulling the paper feed cassette 410 out of the paper feeder main body 401, the force acting in the pull-out direction in the range where the distance between the mounting position and the paper feed cassette 410 is 10 mm or less can be suppressed from becoming large.

Further, it is preferable that the starting point of the second inclination 412a2 in the rail 412, i.e., the junction point between the reference level 412a3 and the second inclination 412a2, and the starting point of the first inclination 412a1, i.e., the junction point between the second inclination 412a2 and the first inclination 412a1 should be in a range in which the rail 412 is in contact with the roller 405 while the paper feed cassette 410 receives the first force from the pull-in unit 500, and should be a position where no influence from any other load is generated.

Further, it was configured so that the rail 412 with the contact face 412a including the first inclination 412a1 and the second inclination 412a2 is provided, among the third cassette wall 410d and fourth cassette wall 410e extending in the forward-rearward direction, on the fourth cassette wall 410e that is closer to the paper feed cassette 410's gravitational center observed when the sheet P is placed. Further, the pull-in unit 500 is configured to be provided on the right guide frame 403 that is provided with the roller 405 that contacts the rail 412 provided at the fourth cassette wall 410e.

In this way, the rail 412 including the contact face 412a is provided on the fourth cassette wall 410e on the side close to the gravitational center of the paper feed cassette 410 in the left-right direction. The pull-in unit 500 is provided on the right guide frame 403 that is provided with the roller 405 that contacts the rail 412. Therefore, when the paper feed cassette 410 is to be inserted into the paper feeder main body 401, the paper feed cassette 410 can be smoothly led into the paper feeder main body 401 without being grabbed.

MODIFICATION

Figure 14:
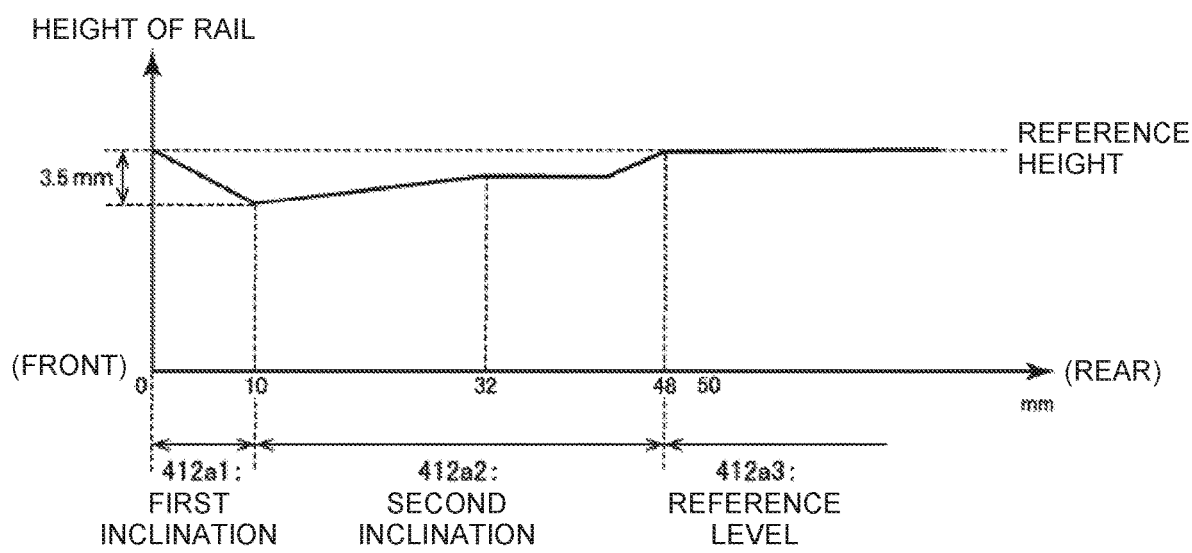
FIG. 14 schematically shows the height difference of the rails of the paper feed cassette for a modification of the embodiment.

Then, referring to FIG. 14, the configuration of the paper feeder 400 according to a modification of the embodiment will be described. FIG. 14 schematically shows the height difference of the rail 412 of the paper feed cassette 410 according to the modification of the embodiment.

The paper feeder 400 according to the modification of the embodiment differs from the paper feeder 400 according to the embodiment in the shape of the contact face 412a of the rail 412. In any other respect, the paper feeder 400 according to the modification is the same in configuration as the paper feeder 400 according to the embodiment; therefore, the same sign is given to similar parts and their descriptions are omitted.

That is, in the rail 412 according to the modification of the embodiment, differs in that the range where the second inclination 412a2 of the contact face 412a is formed is longer than the range where the second inclination 412a2 of the contact face 412a of the rail 412 according to the embodiment is formed. Further, in the contact face 412a of the rail 412 according to the embodiment, the second inclination 412a2 has a single inclined face that inclines linearly, whereas in the contact face 412a of the rail 412 according to the modification of the present invention, the second inclination 412a2 has two inclined faces sandwiching therebetween a horizontal face. That is, the second inclination 412a2 is formed like a staircase with the inclined face and the horizontal face alternately arranged.

Thus, in the rail 412 according to the modification of the embodiment, the second inclination 412a2 of the contact face 412a is formed like the staircase, so that the height difference, from the reference height, caused by the first inclination 412a1 can be eliminated step by step. Therefore, in the rail 412 according to the modification of the embodiment; when the paper feed cassette 410 is to be pulled out of the paper feeder main body 401, the second inclination 412a2, when contacting the roller 405, allows the paper feed cassette 410 to move more smoothly on the roller 405 toward the first inclination 412a1.

What is claimed is:

1. A paper feeder, comprising:
   a main body; and
   a paper feed cassette capable of being inserted and pulled out in a first direction relative to the main body,
   wherein the main body has
      a pull-in device that pulls the paper feed cassette to a mounting position, and
      a support member that supports the paper feed cassette,
   the support member has
      a guide frame having a first horizontal surface extending in the first direction, and
      a first roller contacting the paper feed cassette from below,
   the paper feed cassette has
      a bottom portion on which paper is placed,
      a side wall standing from the bottom portion and extending in the first direction,
      a rail horizontally protruding outward from the side wall and contacting the first roller, and
      a second roller contacting an upper surface of the guide frame, and
   in an area where the rail contacts the first roller, when the paper feed cassette is pulled in by the pull-in device, the rail includes a first inclination that is inclined to be lower from a front end of the rail, and from a front portion of the main body toward a back portion of the main body,
   wherein the rail further includes a second inclination that is connected to a back end of the first inclination on the back portion of the main body and that is inclined to be higher from the front portion of the main body toward the back portion of the main body,
   wherein the second inclination is inclined in a form of a staircase,
   wherein the second inclination includes two or more inclined surfaces and one or more second horizontal surfaces connected to the two or more inclined surfaces.

2. The paper feeder according to claim 1, wherein the pull-in device is provided in the guide frame.

3. The paper feeder according to claim 2, wherein the first roller is a rotational body that rotates, such that the paper feed cassette is movable relative to the guide frame in the first direction.

4. The paper feeder according to claim 2, wherein
   the first roller is provided at an end of the guide frame on the front portion of the main body or at a position adjacent to the end of the guide frame on the front portion of the main body.

5. The paper feeder according to claim 1,
   wherein the paper feed cassette has a plurality of side walls, including the side wall,
   with a direction orthogonal to the first direction in the bottom portion defined as a second direction, the plurality of side walls includes
      a first side wall placed at one end of the bottom portion in the second direction and extending in the first direction, and
      a second side wall placed at another end of the bottom portion in the second direction and extending in the first direction,
   in the second direction, the first side wall is placed closer to a gravitational center of the paper feed cassette than the second side wall, and
   the rail is provided at the first side wall.

6. The paper feeder according to claim 1, wherein
   the paper feed cassette includes a protrusion, as a rod member, protruding from the front portion of the main body toward the back portion of the main body,
   the main body includes a hole through which the protrusion is inserted, and
   at least a part of an inner periphery of the hole has an irregular shape.

7. An image forming apparatus, comprising:
   the paper feeder according to claim 1; and
   an image former that forms an image on the paper sent out from the paper feeder.

8. A paper feeder, comprising:
   a main body; and
   a paper feed cassette capable of being inserted and pulled out in a first direction relative to the main body,
   wherein the main body has
      a pull-in device that pulls the paper feed cassette to a mounting position, and
      a support member that supports the paper feed cassette,
   the paper feed cassette has a rail contacting a top portion of the support member and extending in the first direction,
   in an area where the rail contacts the support member, when the paper feed cassette is pulled in by the pull-in device, the rail includes a first inclination that is inclined to be higher toward a pull-out direction of the paper feed cassette, and
a second inclination that is connected to an end of the first inclination on a side of an inserting direction of the paper feed cassette and that is inclined to be higher toward the inserting direction,
the second inclination is inclined in a form of a staircase and includes two or more inclined surfaces, and one or more horizontal surfaces connected to the two or more inclined surfaces,
the rail has a reference level extending in the first direction, such that the paper feed cassette is at a predetermined reference height in the mounting position, and
the one or more horizontal surfaces are lower than the reference level.

* * * * *